United States Patent Office 3,436,042
Patented Apr. 1, 1969

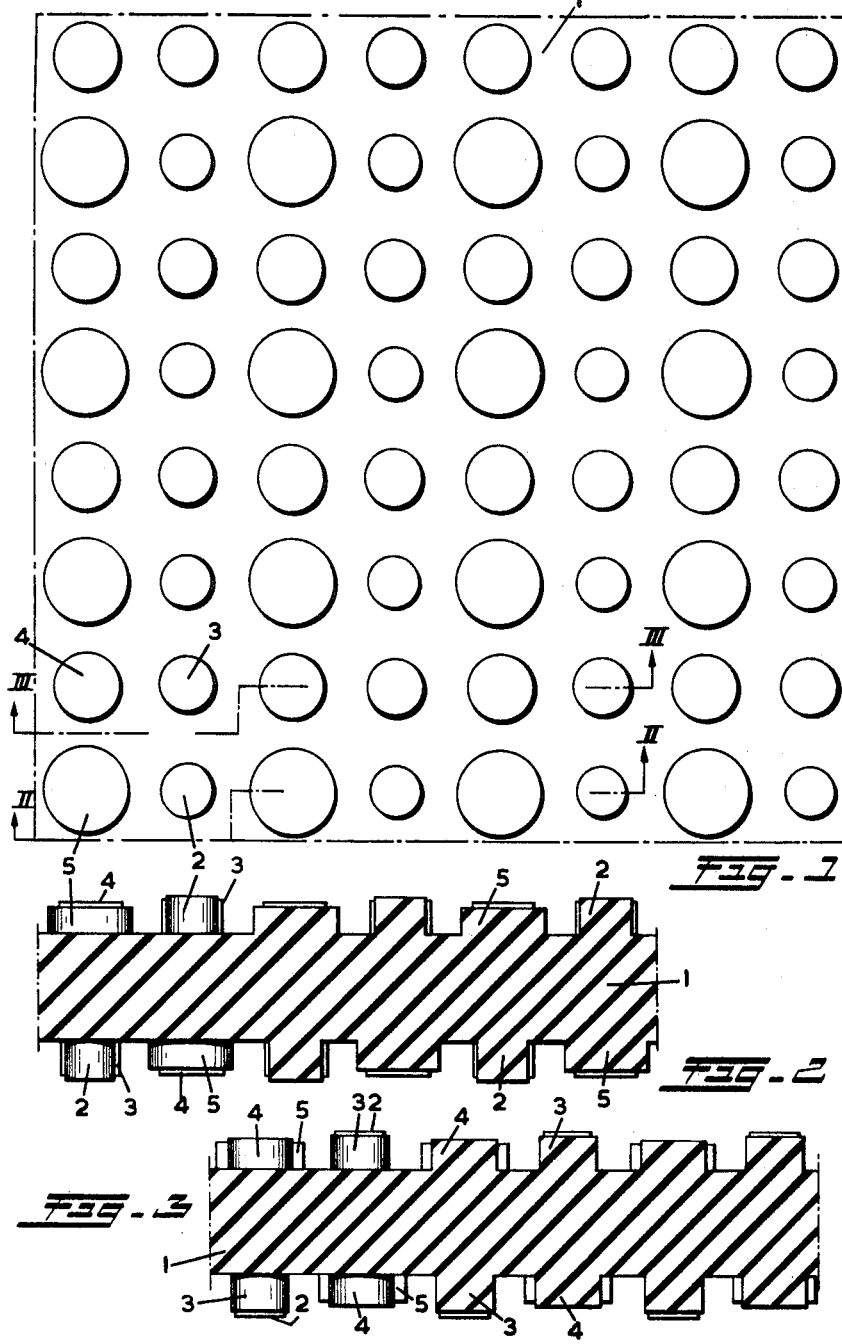

3,436,042
VIBRATION DAMPENING PADS
Willy Van Goubergen, Brussels, Belgium, assignor to N.V. Imexin S.A., Brussels, Belgium, a corporation of Belgium
Filed Mar. 27, 1967, Ser. No. 626,048
Claims priority, application Netherlands, Apr. 5, 1966, 6604539
Int. Cl. E02d 27/44
U.S. Cl. 248—22
1 Claim

ABSTRACT OF THE DISCLOSURE

A rubber or plastic pad is provided with groups of elevations of different heights, combining frictional grip on adacent surfaces with high dampening characteristics under varying loads. When the elevations are on both faces of the pad, elevations of similar height on opposite faces are preferably offset relative to each other to lengthen the path of travel of vibrations.

---

This invention relates to vibration dampening pads, particularly designed for supporting machines, motors engines, and structural works, such as bridges, which are subected to, or generate, vibrations. Such pads are commonly made of more or less resilient rubber or synthetic material and are frequently provided on one or both faces with ribs or studs, to increase the grip of the pad on its carrying surface or on the surface bearing on the pad, thereby to resist lateral movement of the load supported by the pad as it is subjected to vibrations. The vibration dampening capacity of such ribbed or studded pads has been found, as a practical matter, to be rather poor, and utterly insufficient for countless uses, such as the vibration-free support of textile machinery, presses, compressors, etc.

It is an object of the invention to remedy this deficiency by providing an improved construction of a vibration dampening pad having ribs or studs provided on one or both faces thereof.

The invention accordingly provides a vibration dampening pad of the kind described, wherein the ribs or studs are arranged in groups, with the ribs or studs in each group having different heights. According to a further feature of the invention the pad is provided with ribs or studs on both faces, with the ribs or studs of similar height on opposite faces being offset relative to each other.

One embodiment of the invention will be described, by way of example, with reference to the accompanying drawings, in which FIG. 1 is a plan view of a pad according to the invention;

FIG. 2 is a sectional view on the line II—II in FIG. 1;

FIG. 3 is a sectional view on the line III—III in FIG 1.

Referring to the drawings, the pad consists of web 1 of a suitable material, such as rubber or synthetic material, which is on its upper and lower face provided with a large number of studs formed integrally with the web and consisting of the same material. In the embodiment as illustrated, the studs are arranged in groups of four. In each group the stud 2 is higher than the stud 3, which is higher than the stud 4, which is higher than the stud 5. The groups of studs on the bottom face of the web 1 are so disposed relative to the groups on the top face of the web that equally high studs on opposite faces of the web are offset relative to each other.

The result of the difference in height between the individual studs of each group is that when the pad is used, for example, between a machine foot and a floor, for example, only the highest studs are loaded. Owing to a suitable difference in height in correlation to the firmness of the material of which the web and the studs are made, it is now achieved that when the machine supported by the pad is put into operation and is set vibrating the next lower studs will also be loaded by the weight of the machine before the highest studs have been compressed by the combined load of the machine and the vibrations to such a density that they, and the adacent material of the web of the pad, are no longer capable of dampening the vibrations transmitted to them.

It will be evident that the above explanation with respect to the highest studs and the next lower studs applies in the same way to the other lower studs.

In the case of a pad studded on both faces of the web, the feature of equally high studs on opposite faces of the web being offset relative to each other results in the additional advantage that vibrations transmitted from studs on one face to studs on the other are not passed through the web in a perpendicular direction, but are prescribed a longer, diagonally extending path.

It will be understood that the principle of the present invention allows of a great amount of freedom in the selection of the number of studs in each group. The same applies to the shape, particularly the cross-sectional area of the studs, so that these may take the form of ribs. For that matter, as far as this latter is concerned it is recommendable for the studs to be formed with a greater cross-sectional area as they are less high. This measure is based on the consideration that less high studs only become active in the case of heavy loads due to heavy machine weights and great vibrational forces, so that they must be designed to take up such heavier loads properly.

Naturally, in selecting the material of which the pads are made, the purpose for which the pads are intended will be taken into account.

It has been found experimentally that the pads according to the invention produce a dampening effect which it has hitherto been impossible to attain.

I claim:
1. A vibration dampening pad comprising a web of a suitable material, such as rubber, having an upper and a lower face each provided with studs arranged in groups, the studs of each group having like heights and size, the studs of different groups having different heights and size, equally high studs on opposite faces of the web being offset relative to each other but aligned with the studs of a different group.

References Cited

UNITED STATES PATENTS

| 2,875,967 | 3/1959 | Dodge | 248—22 |
| 3,148,390 | 9/1964 | Vakousky | 5—345 |

FOREIGN PATENTS

| 398,657 | 9/1933 | Great Britain. |
| 133,644 | 7/1949 | Australia. |

JOHN PETO, *Primary Examiner.*

U.S. Cl. X.R.
248—358